(12) United States Patent
Constans et al.

(10) Patent No.: US 12,216,207 B2
(45) Date of Patent: Feb. 4, 2025

(54) ULTRASOUND IMAGING DEVICE

(71) Applicant: MODULEUS, Tours (FR)

(72) Inventors: Charlotte Constans, Tours (FR);
Adrien Bailly, Tours (FR)

(73) Assignee: MODULEUS, Tours (FR)

( * ) Notice: Subject to any disclaimer, the term of this patent is extended or adjusted under 35 U.S.C. 154(b) by 223 days.

(21) Appl. No.: 17/921,596

(22) PCT Filed: Apr. 16, 2021

(86) PCT No.: PCT/EP2021/059893
§ 371 (c)(1),
(2) Date: Oct. 26, 2022

(87) PCT Pub. No.: WO2021/219402
PCT Pub. Date: Nov. 4, 2021

(65) Prior Publication Data
US 2023/0168371 A1 Jun. 1, 2023

(30) Foreign Application Priority Data
Apr. 30, 2020 (FR) ................................. 20/04326

(51) Int. Cl.
*G01S 15/89* (2006.01)
(52) U.S. Cl.
CPC ...... *G01S 15/8927* (2013.01); *G01S 15/8993* (2013.01)
(58) Field of Classification Search
CPC .............................................. G01S 15/8927
(Continued)

(56) References Cited

U.S. PATENT DOCUMENTS

| 5,203,335 A | 4/1993 | Noujaim et al. |
| 6,111,816 A | 8/2000 | Chiang et al. |

(Continued)

FOREIGN PATENT DOCUMENTS

| EP | 1491913 A2 | 12/2004 |
| FR | 3086063 A1 | 3/2020 |

(Continued)

OTHER PUBLICATIONS

Notice of Allowance and Fees Due (PTOL-85) Mailed on Apr. 17, 2024 for U.S. Appl. No. 17/274,387, 5 page(s).
(Continued)

*Primary Examiner* — Walter L Lindsay, Jr.
*Assistant Examiner* — Philip T Fadul
(74) *Attorney, Agent, or Firm* — Kaplan Breyer Schwarz LLP

(57) ABSTRACT

An ultrasound imaging device includes an assembly of ultrasound transducers. The ultrasound transducers are divided into a plurality of sub-assemblies each having P ultrasound transducers. The ultrasound imaging device further includes, for each sub-assembly, K transceiver circuits and a configurable routing circuit coupling the P ultrasound transducers of the sub-assembly to the K transceiver circuits where P and K are integers greater than or equal to 2, with K smaller than P. Each sub-assembly further includes at least one mobile transducer capable of being, via the routing circuit, disconnected or connected to any one of a plurality of predefined transceiver circuits among the K transceiver circuits of the sub-assembly.

10 Claims, 2 Drawing Sheets

(58) Field of Classification Search
USPC .......................................................... 73/625
See application file for complete search history.

(56) References Cited

U.S. PATENT DOCUMENTS

| | | | |
|---|---|---|---|
| 6,352,510 | B1 | 3/2002 | Barabash et al. |
| 6,582,367 | B1 | 6/2003 | Robinson et al. |
| 6,582,369 | B1 | 6/2003 | Huang et al. |
| 6,994,674 | B2 | 2/2006 | Sheljaskow et al. |
| 7,654,142 | B2 | 2/2010 | Dominguez et al. |
| 8,702,609 | B2 | 4/2014 | Hadjicostis |
| 2004/0267135 | A1* | 12/2004 | Takeuchi ............ G01S 15/8925 600/459 |
| 2006/0119223 | A1 | 6/2006 | Ossmann |
| 2009/0005684 | A1 | 1/2009 | Kristoffersen et al. |
| 2010/0174194 | A1 | 7/2010 | Chiang et al. |
| 2014/0155751 | A1 | 6/2014 | Banjanin et al. |
| 2016/0287213 | A1 | 10/2016 | Ishitsuka et al. |
| 2021/0341602 | A1 | 11/2021 | Bailly |
| 2022/0110606 | A1* | 4/2022 | Capri ................... A61C 19/043 |

FOREIGN PATENT DOCUMENTS

| | | |
|---|---|---|
| JP | 2006-218408 | 8/2006 |
| JP | 2007-029268 | 2/2007 |
| JP | 2010-164390 | 7/2010 |
| JP | 2012-152317 | 8/2012 |
| WO | 03/00137 A1 | 1/2003 |
| WO | 2018/127655 A1 | 7/2018 |
| WO | 2020/053309 A1 | 3/2020 |

OTHER PUBLICATIONS

Notice of Allowance and Fees Due (PTOL-85) Mailed on May 2, 2024 for U.S. Appl. No. 17/274,387, 7 page(s).
Non-Final Rejection Mailed on Nov. 3, 2023 for U.S. Appl. No. 17/274,387, 8 page(s).
Authorized Officer: Sartoni, Giovanni, French Search Report issued in counterpart French patent application No. 18/58199, Jul. 11, 2019, 2 pp.
Authorized Officer: Sartoni, Giovanni, International Search Report issued in counterpart PCT application No. PCT/EP2019/074280, Dec. 13, 2019, 5 pp.
Authorized Officer: Zaneboni, Thomas, International Search Report issued in PCT application No. PCT/EP2021/059893, Jun. 17, 2021, 2 pp.
English translation of the Written Opinion of the International Search Authority issued in counterpart PCT application No. PCT/EP2019/074280, Dec. 13, 2019, 6 pp.
English Translation of the Written Opinion of the International Searching Authority issued in PCT application No. PCT/EP2021/059893, Jun. 17, 2021, 6 pp.
Office Action and English Translation thereof issued in Japanese Patent Application No. 2022-566450 on Sep. 3, 2024.

* cited by examiner (A)            (B)

(A)            (B)

ULTRASOUND IMAGING DEVICE

RELATED APPLICATIONS

The present patent application claims the priority benefit of French patent application FR20/04326 which is herein incorporated by reference.

FIELD

The present disclosure concerns the field of ultrasound imaging, and more particularly aims at an ultrasound imaging device comprising a plurality of ultrasound transducers and an electronic circuit for controlling these transducers.

BACKGROUND

An ultrasound imaging device conventionally comprises a plurality of ultrasound transducers, and an electronic control circuit connected to the transducers. In operation, the transducer assembly is placed in front of a body, an image of which is desired to be acquired. The electronic device is configured to apply electric excitation signals to the transducers to cause the emission of ultrasound waves by the transducers, towards the body to be analyzed. The ultrasound waves emitted by the transducers are reflected by the body to be analyzed (by its internal and/or surface structure), and then return to the transducers, which convert them back into electric signals. The electric response signals are read by the electronic control circuit and may be stored and analyzed to deduce therefrom information relative to the studied body.

The ultrasound transducers may be arranged in a linear array in the case of two-dimensional image acquisition devices, or in an array in the case of three-dimensional image acquisition devices. In the case of a two-dimensional image acquisition device, the acquired image is representative of a cross-section of the studied body in a plane defined by the alignment axis of the transducers of the linear array on the one hand, and by the emission direction of the transducers on the other hand. In the case of a three-dimensional image acquisition device, the acquired image is representative of a volume defined by the two alignment directions of the transducers of the array and by the emission direction of the transducers.

Three-dimensional image acquisition devices are more particularly considered herein. In such devices, the number of ultrasound transducers may be very high, typically from several hundreds to several thousands, or even more.

Three-dimensional ultrasound image acquisition devices have already been provided where, to limit the complexity of the electronic control circuit, a same transceiver circuit is shared by a plurality of ultrasound transducers, through a configurable multiplexing circuit. Examples of embodiment and of operating modes of such devices are particularly described in patent application FR3086063 previously filed by the applicant.

It would be desirable to at least partly improve one or a plurality of aspects of known three-dimensional ultrasound image acquisition devices.

SUMMARY OF THE INVENTION

For this purpose, an embodiment provides an ultrasound imaging device comprising an assembly of ultrasound transducers distributed in a plurality of sub-assemblies of P transducers each, the device comprising, for each sub-assembly:

K transceiver circuits; and a configurable routing circuit coupling the P transducers of the sub-assembly to the K transceiver circuits, wherein P and K are integers greater than or equal to 2, with K smaller than P, and wherein each sub-assembly comprises at least one transducer, called mobile transducer, capable of being, via the routing circuit, disconnected or connected to any one among a plurality of predefined transceiver circuits from among the K transceiver circuits of the sub-assembly.

According to an embodiment, each sub-assembly further comprises at least one transducer, called fixed transducer, capable of being, via the routing circuit of the sub-assembly, disconnected or connected to a single predefined transceiver circuit among the K transceiver circuits of the sub-assembly.

According to an embodiment, the transducers of the assembly are arranged in rows and columns.

According to an embodiment, the transducers of the assembly are arranged in an array.

According to an embodiment, the transducers of the assembly form a pattern of generally circular shape.

According to an embodiment, each sub-assembly is an array of neighboring transducers of the assembly.

According to an embodiment, each sub-assembly comprises a plurality of mobile transducers, arranged along a diagonal of the array of neighboring transducers forming the sub-assembly.

According to an embodiment, each sub-assembly comprises a plurality of fixed transducers arranged along another diagonal of the array of neighboring transducers forming the sub-assembly.

According to an embodiment, each sub-assembly is a sub-array of 2×2 neighboring transducers.

According to an embodiment, the device further comprises a control circuit adapted to controlling the configurable routing circuits of the different sub-assemblies.

According to an embodiment, the control circuit is configured to, during an ultrasound image acquisition phase, in each sub-assembly of transducers:

connect the P transducers of the sub-assembly to the K transceiver circuits of the sub-assembly via the configurable routing circuit of the sub-assembly during a phase of emission of an ultrasound wave; and then connect a single transducer of the sub-assembly to each transceiver circuit of the sub-assembly during a phase of reception of an echo of the emitted ultrasound wave.

BRIEF DESCRIPTION OF THE DRAWINGS

The foregoing features and advantages, as well as others, will be described in detail in the rest of the disclosure of specific embodiments given by way of illustration and not limitation with reference to the accompanying drawings, in which.

DESCRIPTION OF THE EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, the various possible applications of described imaging devices have not been detailed, the described embodiments being compatible with usual applications of ultrasonic imaging devices. Further, the properties (frequencies, shapes, amplitudes, etc.) of the electric excitation signals applied by the control circuit to the ultrasound transducers have not been detailed, the described embodiments being compatible with the excitation signals currently used in ultrasound imaging systems, which may be selected according to the considered application and in particular to the nature of the body to be analyzed and to the type of information which is desired to be acquired. Similarly, the various processings applied to the electric signals delivered by the ultrasound transducers and read by the control circuit to extract useful information relative to the body to be analyzed have not been detailed, the described embodiments being compatible with processings currently used in ultrasound imaging systems. Further, the forming of the ultrasound transducers and of the control circuit of the described imaging devices has not been detailed, the detailed structure of these elements being within the abilities of those skilled in the art based on the indications of the present disclosure, by using known ultrasound transducer and electronic circuit forming techniques.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

Figure 1:
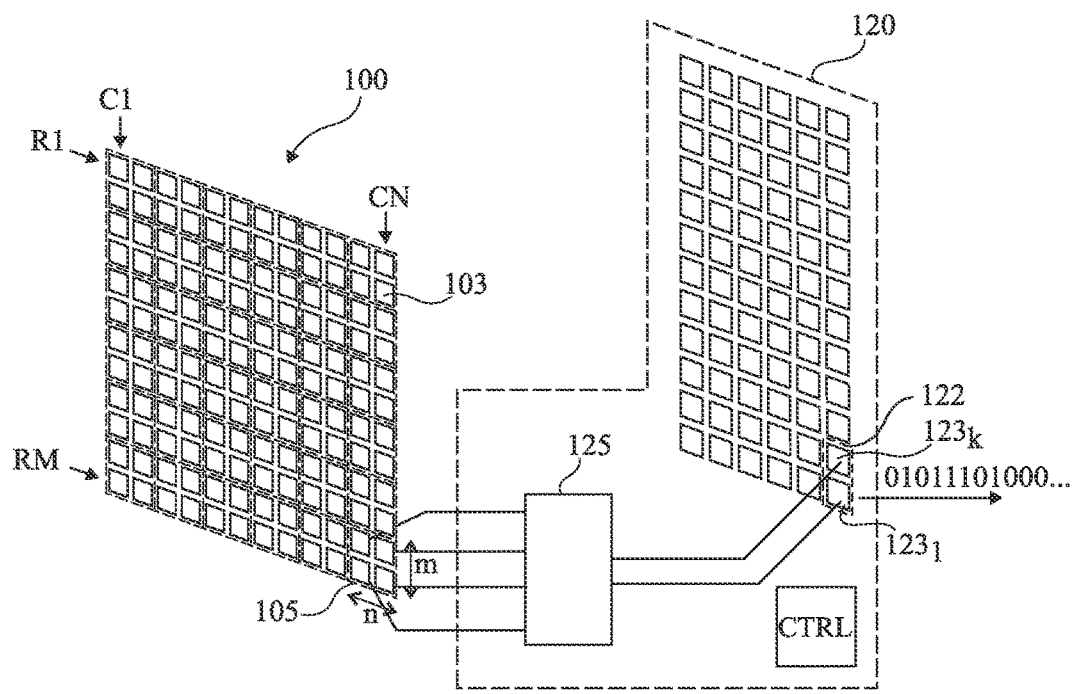
FIG. 1 is a simplified perspective view of an example of an ultrasound image acquisition device according to an embodiment.

FIG. 1 is a simplified perspective view of an example of an ultrasound image acquisition device according to an embodiment.

The device of FIG. 1 comprises an array 100 of elementary ultrasound transducers 103, arranged along M rows Ri, with i an integer ranging from 1 to M, and N columns Cj, with j an integer ranging from 1 to N, M and N being integers greater than or equal to 2. In the shown example, M=N=12. The described embodiments are of course not limited to this specific case. It should in particular be noted that values M and N may be different from each other. Elementary transducers 103 are for example all identical, to within manufacturing dispersions. Transducers 103 may be CMUT-type transducers (capacitive membrane ultrasonic transducers), piezoelectric transducers, crystal transducers, or any other type of ultrasound transducers.

In the example of FIG. 1, array 100 is divided into a plurality of sub-arrays 105 of neighboring transducers, each comprising a plurality of rows and a plurality of columns. By neighboring transducers, there is here meant that, in each sub-array 105, the transducers 103 of the sub-array are gathered, that is, no transducer 103 of another sub-array 105 is arranged between two transducers 103 of the sub-array. In other words, each sub-array 105 is formed by all the transducers 103 located at the intersection of an assembly of a plurality of consecutive rows Ri and of a plurality of consecutive columns Cj of array 100. In the example of FIG. 1, sub-arrays 105 do not overlap, that is, each transducer 103 belongs to a single sub-array 105 of the device. Sub-arrays 105 for example all have the same dimensions. Hereafter, m and n respectively designate the number of rows and the number of columns of each sub-array 105, m and n being integers greater than or equal to 2. In the shown example, m=n=2. The described embodiments are however not limited to this specific case. It should in particular be noted that values m and n may be different from each other. Preferably, M is a multiple of m and N is a multiple of n. Thus, array 100 is divided into (M/m)*(N/n) sub-arrays 105 arranged in an array layout. In the example of FIG. 1, array 100 is divided into 6×6 sub-arrays 105.

The device of FIG. 1 further comprises an electronic control circuit 120 connected to the transducers 103 of array 100. Electronic control circuit 120 comprises, for each sub-array 105 of array 100:

an assembly 122 of K transceiver circuits $123_k$ specifically dedicated to the m*n transducers of sub-array 105, with K an integer greater than or equal to 2 and smaller than the number P=m*n of transducers of sub-array 105, and k an integer ranging from 1 to K; and a configurable routing circuit 125 specifically dedicated to the transducers 103 of sub-array 105, coupling the m*n transducers 103 of sub-array 105 to the K transceiver circuits of the corresponding assembly 122.

Thus, electronic control circuit 120 comprises (M/m)*(N/n) assemblies 122 of K transceiver circuits $123_k$ each, that is, a total of (M/n)*(M/m)*K transceiver circuits $123_k$, for example, identical or similar, and (M/m)*(N/n) routing circuits 125, for example, identical or similar. For simplification, a single routing circuit 125 has been shown in FIG. 1. In the example of FIG. 1, control circuit 120 comprises K=2 transceiver circuits $123_1$ and $123_2$ per sub-array 105, that is, a total of 6×6×2=72 transceiver circuits $123_k$.

In the example of FIG. 1, each transducer 103 can only be coupled to one or a plurality of transceiver circuits $123_k$ of the assembly 122 of transceiver circuits associated with the sub-array 105 to which it belongs, via the corresponding routing circuit 125. In other words, a transducer 103 of a sub-array 105 cannot be coupled to a transceiver circuit $123_k$ of an assembly 122 associated with another sub-array 105.

According to an aspect of the embodiment of FIG. 1, each sub-array 105 comprises at least one transducer 103, which will be called mobile transducer hereafter, capable of being, via the routing circuit 125 associated with sub-array 105, disconnected or connected to any one, alone, among a plurality of predefined transceiver circuits $123_k$ among the K transceiver circuits of the corresponding assembly 122. Each sub-array 105 may comprise a plurality of mobile transducers.

Each sub-array 105 may further comprise one or a plurality of other transducers 103 which will be called fixed transducers hereafter, where each fixed transducer may be, via the routing circuit 125 associated with sub-array 105, disconnected or connected to a single predefined transceiver circuit $123_k$ among the K transceiver circuits of the corresponding assembly 122.

The (M/m)*(N/n) routing circuits 125 are for example individually controllable. For this purpose, electronic control circuit 120 may comprise a single control circuit CTRL coupled to control terminals (not detailed in FIG. 1) of the different circuits 125.

Figure 2:
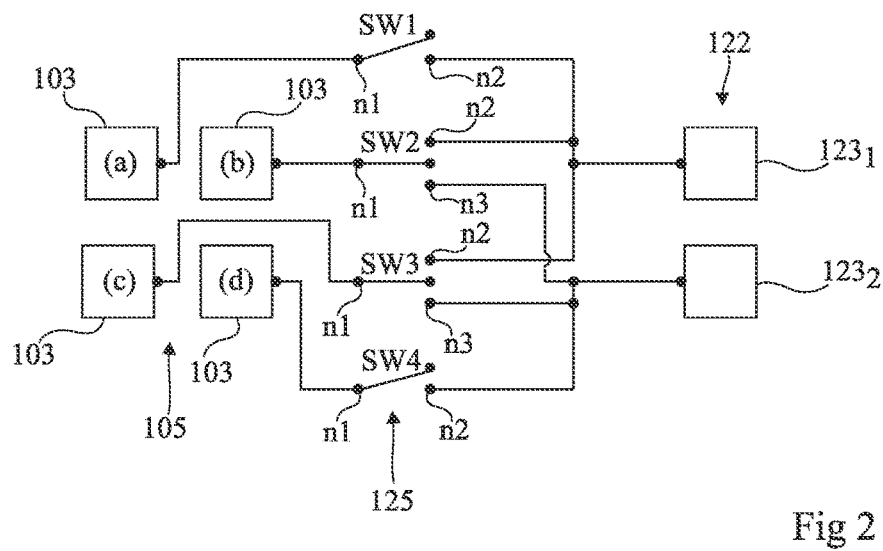
FIG. 2 illustrates in further detail an example of embodiment of a configurable routing circuit of the device of FIG. 1.

FIG. 2 illustrates in further detail an example of embodiment of a configurable routing circuit 125 of the device of FIG. 1. For clarity, a single routing circuit 125, as well as the sub-array 105 of transducers 103 and the assembly 122 of transceiver circuits $123_k$ associated with this routing circuit, have been shown in FIG. 2.

The configuration illustrated in FIG. 1, where m=n=2 and K=2, is considered in this example. Each circuit 125 thus couples four elementary transducers 103 with two transceiver circuits $123_1$ and $123_2$.

In the example of FIG. 2, in each sub-array 105, two of transducers 103 are fixed transducers, and the two other transducers 103 are mobile transducers. The fixed transducers are arranged on a first diagonal of the sub-array, and the mobile transducers are arranged on the second diagonal of the sub-array. In the shown example, the two fixed transducers respectively correspond to the transducers positioned at the top left (position (a)) and at the bottom right (position (d)) in sub-array 105, and the two mobile transducers respectively correspond to the transducers positioned at the top right (position (b)) and at the bottom left (position (c)) in sub-array 105.

The different possibilities of connection of the transducers 103 of sub-array 105 to the transceiver circuits $123_k$ of assembly 122, via configurable routing circuit 125, will now be described.

The first fixed transducer (position (a)) may be either disconnected, that is, electrically insulated from the assembly of the transceiver circuits $123_k$ of the device, or connected to the transceiver circuit $123_1$ of assembly 122. This transducer, called transducer 103(a) hereafter, can however be connected to no other transceiver circuit $123_k$ of the device.

The second fixed transducer (position (d)) may be either disconnected, or connected to the transceiver circuit $123_2$ of assembly 122. This transducer, called transducer 103(d) hereafter, can however be connected to no other transceiver circuit $123_k$ of the device.

The first mobile transducer (position (b)) may be either disconnected, or connected to any one, alone, of the transceiver circuits $123_1$ and $123_2$ of assembly 122. This transducer, called transducer 103(b) hereafter, can however be connected to no other transceiver circuit $123_k$ of the device.

Similarly, the second mobile transducer (position (d)) may be either disconnected, or connected to any one, alone, of the transceiver circuits $123_1$ and $123_2$ of assembly 122. This transducer, called transducer 103(d) hereafter, can however be connected to no other transceiver circuit $123_k$ of the device.

In FIG. 2, circuit 125 has been schematically shown in the form of 4 switches SW1, SW2, SW3, and SW4.

Switch SW1 is a two-state switch having a first conduction terminal n1 coupled, for example connected, to an electrode of transducer 103(a), and a second conduction electrode n2 coupled, for example connected, to an input or output terminal of transceiver circuit $123_1$. In a first state, called off state, of switch SW1, the terminals n1 and n2 of switch SW1 are electrically insulated from each other. In a second state, called on state, of switch SW1, the terminals n1 and n2 of switch SW1 are electrically connected to each other.

Switch SW2 is a three-state switch having a first conduction terminal n1 coupled, for example connected, to an electrode of transducer 103(b), a second conduction terminal n2 coupled, for example connected, to an input or output terminal of transceiver circuit $123_1$, and a third conduction terminal n3, electrically insulated from terminal n2, coupled, for example connected, to an input or output terminal of transceiver circuit $123_2$. In a first state, called off state, of switch SW2, the terminal n1 of switch SW2 is electrically insulated from its terminals n2 and n3. In a second state of switch SW2, the terminals n1 and n2 of switch SW2 are electrically connected to each other. In a third state of switch SW2, the terminals n1 and n3 of switch SW2 are electrically connected to each other.

Switch SW3 is a three-state switch having a first conduction terminal n1 coupled, for example connected, to an electrode of transducer 103(c), a second conduction terminal n2 coupled, for example connected, to an input or output terminal of transceiver circuit $123_1$, and a third conduction terminal n3, electrically insulated from terminal n2, coupled, for example connected, to an input or output terminal of transceiver circuit $123_2$. In a first state, called off state, of switch SW3, the terminal n1 of switch SW3 is electrically insulated from its terminals n2 and n3. In a second state of switch SW3, the terminals n1 and n3 of switch SW3 are electrically connected to each other. In a third state of switch SW3, the terminals n1 and n3 of switch SW3 are electrically connected to each other.

Switch SW4 is a two-state switch having a first conduction terminal n1 coupled, for example connected, to an electrode of transducer 103(d), and a second conduction terminal n2 coupled, for example connected, to an input or output terminal of transceiver circuit $123_2$. In a first state, called off state, of switch SW4, the terminals n1 and n2 of switch SW4 are electrically insulated from each other. In a second state, called on state, of switch SW4, the terminals n1 and n2 of switch SW4 are electrically connected to each other.

Thus, in this example, any two transducers 103 of sub-array 105 may be individually controlled in parallel via respectively transceiver circuits $123_1$ and $123_2$ associated with sub-array 105. As a variant, any two transducers, except for two fixed transducers 103(a) and 103(d), may be simultaneously controlled via the same transceiver circuit $123_1$ or $123_2$.

Figure 3:
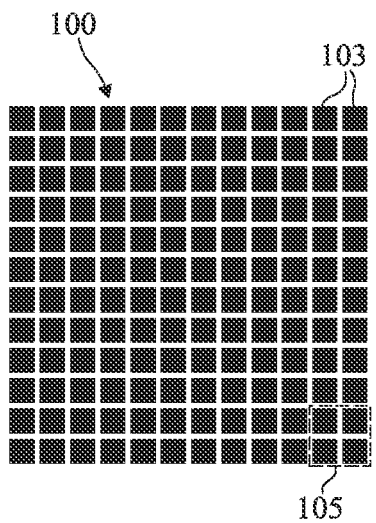
FIG. 3 illustrates an example of a method of acquisition of an ultrasound image by means of the device of FIG. 1.
Figure 3:
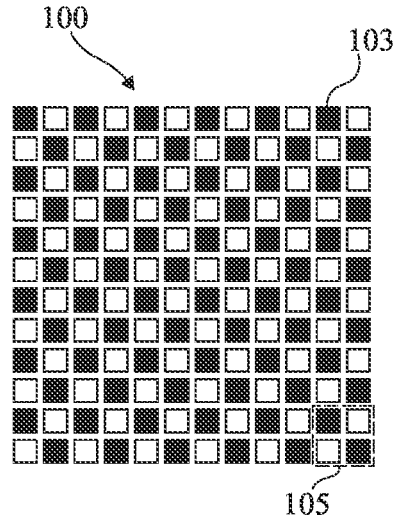

FIG. 3 illustrates an example of a method of acquisition of an ultrasound image by means of the device described in relation with FIGS. 1 and 2.

In this example, the acquisition method comprises a phase of emission of an ultrasound wave, followed by a phase of reception of an echo of the emitted ultrasound wave.

During the emission phase, in each sub-array 105, all the transducers 103 of sub-array 105 are simultaneously connected to the transmit circuits $123_k$ associated with the sub-array, via the corresponding routing circuit 125. This configuration is illustrated by view (A) of FIG. 3, which corresponds to a front view of the array 100 of FIG. 1, where the transducers 103 active in emission mode, that is, the transducers connected to an output terminal of a transceiver circuit $123_k$ during the emission phase, that is, all the transducers 103 in this example, have been shown in black. More particularly, considering the example described in relation with FIG. 2, in each sub-array 105, two transducers 103, for example, fixed transducer 103(a) and mobile transducer 103(b), may be simultaneously connected to a same output terminal of the transceiver circuit $123_1$ of the sub-array, and two other transducers 103, for example mobile transducer 103(c) and fixed transducer 103(d), may be simultaneously connected to an output terminal of the transceiver circuit $123_2$ of the sub-array. As a variant, transducers 103(a) and 103(c) may be simultaneously connected to transceiver circuit $123_1$, and transducers 103(b) and 103(d) may be simultaneously connected to transceiver circuit $123_2$. Each transceiver circuit $123_k$ then applies to the transducers 103 to which it is connected a same electrical excitation signal to cause the emission of an ultrasound wave by these transducers. The excitation signals applied by the different transceiver circuits $123_k$ of a same sub-array 105 may be identical or differentiated. Further, the excitation signals applied by the transceiver circuits $123_k$ of different sub-arrays 105 may be identical or differentiated.

During the receive phase, in each sub-array 105, only K distinct transducers 103 are respectively connected to the K transceiver circuits $123_k$ associated with the sub-array, via the corresponding routing circuit 125. The other transducers 103 are disconnected. In other words, a single transducer 103 is connected to each transmit circuit $123_k$, and each transducer 103 is connected at most to a single transceiver circuit $123_k$. This configuration is illustrated by view (B) of FIG. 3, which corresponds to a front view of the array 100 of FIG. 1, where the transducers 103 active in receive mode, that is, the transducers connected to an input terminal of a transceiver circuit $123_k$ during the receive phase, have been shown in black, and the transducers 103 inactive in receive mode, that is, the transducers not connected to an input terminal of a transceiver circuit $123_k$ during the receive phase have been shown in white. More particularly, in the example described in relation with FIG. 2, in each sub-array 105, a single transducer 103, for example, transducer 103(a), is connected to an input terminal of transceiver circuit $123_1$, and a single other transducer 103, for example, transducer 103(d), is simultaneously connected to an input terminal of transceiver circuit $123_2$. As a variant, only transducers 103(b) and 103(d) are simultaneously connected respectively to transceiver circuits $123_1$ and $123_2$. Preferably, the transducers activated in receive mode are regularly distributed so that the distance between two neighboring transducers 103 activated in receive mode is substantially the same in the row direction and in the column direction, and is substantially constant across the entire surface of array 100. This is in particular the case in the example of view (B) of FIG. 3, where only the transducers of a same diagonal (transducers 103(a) and 103(d) in this example) of each sub-array 105 are activated in receive mode. During the receive phase, each circuit $123_k$ reads an electric signal representative of an ultrasound echo received by the transducer 103 to which it is connected.

An advantage of the method of FIG. 3 is that it enables to obtain an image of relatively high resolution since, during the receive phase, each of the (M/m)*(N/n)*K transducers 103 activated in receive mode is individually read from by a specific transceiver circuit $123_k$. Further, the fact of simultaneously activating all the transducers 103 during the emission phase enables to send a relatively high mechanical energy into the medium to be analyzed, and thus to obtain an image having a relatively high signal-to-noise ratio.

As a variant, in at least certain sub-arrays 105 of assembly 100, a portion only of the transducers 103 of the sub-array are activated during the emission phase. Further, as a variant, in at least certain sub-arrays 105 of assembly 100, a plurality of transducers 103 of the sub-array are connected to a same transceiver circuit $123_k$ during the receive phase. In this case, the received signals are summed at the input of transceiver circuit $123_k$, for example such as described in the above-mentioned patent application FR3086063.

Thus, the above-described solution, of providing a ratio of K transceiver circuits for m*n transducers, is an advantageous compromise in terms of image quality and of complexity of the control circuits, with respect:

on the one hand to devices called fully populated, non-configurable, where each transducer is associated with a dedicated transceiver circuit (ratio of 1 to 1 between the transceiver circuits and the transducers); and on the other hand to devices of the type described in the above-mentioned patent application FR3086063, comprising a single transceiver circuit per sub-array 105 (ratio of 1 to m*n between the transceiver circuits and the transducers).

This compromise, combined with the provision of mobile transducers, that is, capable of being connected as desired, via routing circuits 125, to different transceiver circuits, enables to implement a large variety of acquisition scenarios, and thus to perform highly-accurate analyses. The optional provision of fixed transducer in each sub-array 105 advantageously enables to limit the complexity of routing circuits 125.

The tests performed by the inventors have particularly shown that for a same number and a same layout of the elementary transducers 103, the quality of the images acquired with a device of the type described in relation with FIGS. 1 and 2 and according to the control method of FIG. 3 is substantially the same as with a fully populated device (one transceiver circuit per elementary transducer), particularly in terms of contrast-to-noise ratio.

Figure 4:
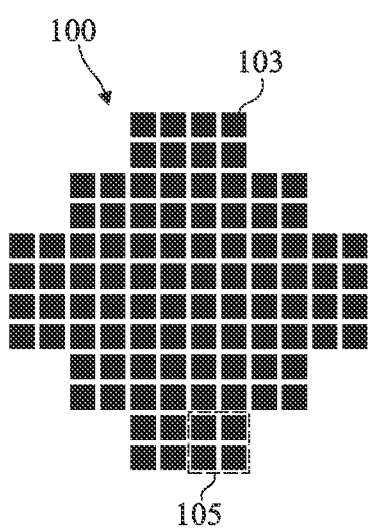
FIG. 4 schematically illustrates an alternative embodiment of the device of FIGS. 1 and 2 and of the acquisition method of FIG. 3.
Figure 4:
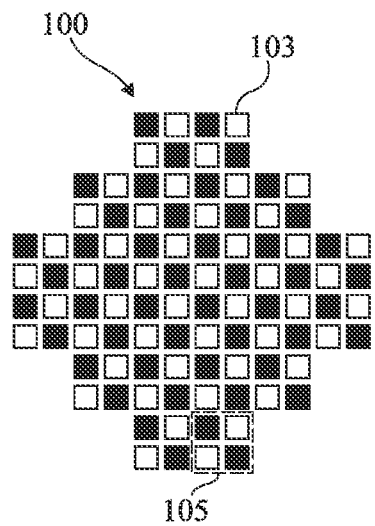

FIG. 4 illustrates a variant of the acquisition device described in relation with FIGS. 1 and 2 and of the acquisition method described in relation with FIG. 3.

The variant of FIG. 4 differs from what has been previously-described mainly in that, in this variant, sub-arrays 105 located at the four corners of the array 100 of the device of FIG. 1, as well as the corresponding routing circuits 125 and transceiver circuits $123_k$, have been omitted. Thus, instead of having a substantially square general shape in the example of FIG. 1, the assembly 100 of elementary transducers 103 of the acquisition device of FIG. 4 has a substantially circular general shape. For the rest, the layout and the operation of the device are identical or similar to what has been described hereabove in relation with FIGS. 1 to 3.

The tests performed by the inventors have shown that the loss of image quality linked to the suppression of the transducers from the corners of the array is negligible, for a significant gain in terms of cost and complexity, linked to the decrease in the number of transducers, in the number of configurable routing circuits, in the number of transceiver circuits, but also in the quantity of signals to be processed at the input of the transmit paths and at the output of the receive paths of the device.

Various embodiments and variants have been described. Those skilled in the art will understand that certain features of these various embodiments and variants may be combined, and other variants will occur to those skilled in the art. In particular, the described embodiments are not limited to the above-described examples where the elementary transducers 103 of the acquisition device are arranged in rows and in columns. More generally, the assembly 100 of elementary transducers 103 of the acquisition device may have any other layout than those described hereabove. Further, the described embodiments are not limited to the specific examples described hereabove where the sub-assemblies 105 of elementary transducers 103 of assembly 100 sharing a same assembly 122 of K transceiver circuits $123_k$ are arrays of neighboring transducers. More generally, the transducers 103 of each sub-assembly 105 may be arranged according to any other layout, provided for the number P of transducers 103 of each sub-assembly 105 to be greater than the number K of transceiver circuits 123$_k$ of the corresponding assembly 122, with K greater than or equal to 2.

The invention claimed is:

1. An ultrasound imaging device comprising an assembly of ultrasound transducers divided into a plurality of sub-assemblies, each sub-assembly comprising P ultrasound transducers, the device comprising, for each sub-assembly:
   K transceiver circuits; and
   a configurable routing circuit coupling the P ultrasound transducers of the sub-assembly to the K transceiver circuits,
wherein P and K are integers greater than or equal to 2, with K smaller than P,
and wherein each sub-assembly comprises at least one mobile transducer capable of being, via the routing circuit, disconnected or connected to any one of a plurality of predefined transceiver circuits among the K transceiver circuits of the sub-assembly,
wherein each sub-assembly further comprises at least one fixed transducer capable of being, via the routing circuit of the sub-assembly, disconnected or connected to a single one of the predefined transceiver circuits among the K transceiver circuits of the sub-assembly.

2. The device according to claim 1, wherein the P ultrasound transducers of the assembly are arranged in rows and columns.

3. The device according to claim 2, wherein the P ultrasound transducers of the assembly are arranged in an array.

4. The device according to claim 3, wherein the P ultrasound transducers of the assembly form a pattern of generally circular shape.

5. The device according to claim 1, wherein each sub-assembly is an array of neighboring P ultrasound transducers of the assembly.

6. The device according to claim 5, wherein the at least one mobile transducer of each sub-assembly comprises a plurality of mobile transducers, arranged along a diagonal of the array of neighboring ones of the P ultrasound transducers forming the sub-assembly.

7. The device according to claim 6, wherein the P ultrasound transducers of the assembly are arranged in rows and columns and wherein the at least one fixed transducer of each sub-assembly comprises a plurality of fixed transducers, arranged along another diagonal of the array of neighboring ones of the P ultrasound transducers forming the sub-assembly.

8. The device according to claim 5, wherein each sub-assembly is a sub-array of 2×2 neighboring ones of the P ultrasound transducers.

9. Device according to claim 1, further comprising a control circuit adapted to controlling the configurable routing circuits of the different sub-assemblies.

10. The device according to claim 9, wherein the control circuit is configured to, during a phase of acquisition of an ultrasound image, in each sub-assembly of the P ultrasound transducers:
    connect the P ultrasound transducers of the sub-assembly to the K transceiver circuits of the sub-assembly via the configurable routing circuit of the sub-assembly during a phase of emission of an ultrasound wave; and then
    connect a single one of the P ultrasound transducers of the sub-assembly to each transceiver circuit of the sub-assembly during a phase of reception of an echo of the emitted ultrasound wave.

* * * * *